United States Patent
Chelani et al.

(10) Patent No.: US 10,769,388 B2
(45) Date of Patent: Sep. 8, 2020

(54) CHANGING A LANGUAGE FOR A USER SESSION REPLAY

(71) Applicant: INTERNATIONAL BUSINESS MACHINES CORPORATION, Armonk, NY (US)

(72) Inventors: Sunil Chelani, Austin, TX (US); Malarvizhi Kandasamy, Bangalore (IN); Mali Hansraj, Pune (IN); Mohammad N. Nazmi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/693,577

(22) Filed: Nov. 25, 2019

(65) Prior Publication Data

US 2020/0097555 A1 Mar. 26, 2020

Related U.S. Application Data

(63) Continuation of application No. 16/369,662, filed on Mar. 29, 2019, now Pat. No. 10,585,992, which is a (Continued)

(51) Int. Cl.
*G06F 40/58* (2020.01)
*G06F 16/958* (2019.01)
(Continued)

(52) U.S. Cl.
CPC ............ *G06F 40/58* (2020.01); *G06F 16/986* (2019.01); *G06F 40/205* (2020.01); *G06F 40/263* (2020.01)

(58) Field of Classification Search
USPC .............. 704/1–504; 358/403; 716/103–105; 717/136–161
See application file for complete search history.

(56) References Cited

U.S. PATENT DOCUMENTS

| 5,615,301 A | 3/1997 | Rivers |
| 6,859,820 B1 | 2/2005 | Hauduc |

(Continued)

FOREIGN PATENT DOCUMENTS

WO 2009029316 A1 3/2009

OTHER PUBLICATIONS

Syta, James M.; List of IBM Patents or Patent Applications Treated as Related; 1 page.

*Primary Examiner* — Marcus T Riley
(74) *Attorney, Agent, or Firm* — Schmeiser, Olsen & Watts; Brian M. Restauro

(57) ABSTRACT

An approach is provided for changing a language for a replay of a session of a user. Request and response data in the session is captured. If a preferred language for the replay does not match an initial language of content presented to the user in the session, the captured data is translated into the preferred language and the content is presented in the preferred language and not in the initial language. If the preferred language matches the initial language, the content is presented in the initial language, without translating the captured data. An event in the captured data indicates a change in a displayed image. Responsive to searching Hypertext Markup Language (HTML) documents generated from a resource file, the HTML documents are determined to not include an HTML document that specifies the change. The HTML document is generated and employed in the replay of the session.

16 Claims, 3 Drawing Sheets

Related U.S. Application Data continuation of application No. 15/426,736, filed on Feb. 7, 2017, now Pat. No. 10,325,027.

(51) Int. Cl.
*G06F 40/205* (2020.01)
*G06F 40/263* (2020.01)

(56) References Cited

U.S. PATENT DOCUMENTS

| | | | |
|---|---|---|---|
| 7,035,804 B2 | 4/2006 | Saindon | |
| 8,042,055 B2 * | 10/2011 | Wenig | H04L 67/22 |
| | | | 715/763 |
| 8,423,164 B2 * | 4/2013 | Jaeger | G06F 9/453 |
| | | | 700/94 |
| 9,069,759 B2 * | 6/2015 | Shoshan | G06F 9/454 |
| 9,086,931 B2 | 7/2015 | Vargas | |
| 9,201,870 B2 | 12/2015 | Jurach, Jr. | |
| 9,311,287 B2 | 4/2016 | Travieso | |
| 9,639,854 B2 * | 5/2017 | Balasubramanian | G06Q 30/0255 |
| 10,140,320 B2 * | 11/2018 | Trese | G06F 16/215 |
| 10,325,027 B2 * | 6/2019 | Chelani | G06F 40/58 |
| 2006/0294463 A1 | 12/2006 | Chu | |
| 2012/0185236 A1 | 7/2012 | Blodgett | |
| 2012/0221593 A1 * | 8/2012 | Trese | G06F 16/215 |
| | | | 707/769 |
| 2013/0281207 A1 * | 10/2013 | Lyons | G07F 17/3206 |
| | | | 463/33 |
| 2014/0108911 A1 * | 4/2014 | Damale | H04L 67/02 |
| | | | 715/234 |
| 2014/0157243 A1 | 6/2014 | Vargas | |
| 2014/0278342 A1 * | 9/2014 | Shoshan | G06F 40/40 |
| | | | 704/2 |
| 2015/0348071 A1 | 12/2015 | Cochrane | |
| 2015/0379989 A1 * | 12/2015 | Balasubramanian | H04L 67/2847 |
| | | | 704/233 |
| 2018/0225286 A1 * | 8/2018 | Chelani | G06F 40/58 |
| 2019/0228075 A1 * | 7/2019 | Chelani | G06F 40/58 |
| 2020/0097555 A1 * | 3/2020 | Chelani | G06F 40/58 |

\* cited by examiner

CHANGING A LANGUAGE FOR A USER SESSION REPLAY

CROSS REFERENCE TO RELATED APPLICATIONS

This application is a continuation application claiming priority to Ser. No. 16/369,662 filed Mar. 29, 2019 which is a continuation application claiming priority to Ser. No. 15/426,736 filed Feb. 7, 2017, now U.S. Pat. No. 10,325,027 issued Jun. 18, 2019, the contents of which are hereby incorporated by reference.

BACKGROUND

The present invention relates to analyzing a user session at a website, and more particularly to replaying user sessions in a preferred language.

Many e-commerce websites are available in different regional and global languages. The aforementioned web sites use customer experience management software to capture user sessions (e.g., customer visits) at the websites and replay the captured user sessions to analyze and improve the user experience at the websites. Known customer experience management software captures and replays a user session in the same language that had been selected by the customer for the user session. A business analyst may view replayed user sessions at a website and perform an analysis of the user sessions, where the analysis identifies details about each customer visit to the website.

SUMMARY

In one embodiment, the present invention provides a method of changing a language for a replay of a session of a user. The method includes a computer capturing data from requests and responses included in hits in the session. The method further includes based on the captured data, the computer determining an initial language of content presented to the user in the session. The method further includes the computer obtaining a selection by an analyst of a preferred language for the replay of the session. The method further includes the computer determining whether the preferred language selected by the analyst matches the initial language of the content presented to the user in the session. The method further includes if the preferred language selected by the analyst does not match the initial language of the content presented to the user in the session, the computer translating the captured data from the initial language into the preferred language and based on the translated captured data, the computer performing the replay of the session by presenting the content in the preferred language and not in the initial language. The replay of the session is viewed by the analyst. The method further includes if the preferred language matches the initial language, the computer performing the replay of the session by presenting the content in the initial language, without translating the captured data.

In another embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of changing a language for a replay of a session of a user. The method includes the computer system capturing data from requests and responses included in hits in the session. The method further includes based on the captured data, the computer system determining an initial language of content presented to the user in the session. The method further includes the computer system obtaining a selection by an analyst of a preferred language for the replay of the session. The method further includes the computer system determining whether the preferred language selected by the analyst matches the initial language of the content presented to the user in the session. The method further includes if the preferred language selected by the analyst does not match the initial language of the content presented to the user in the session, the computer system translating the captured data from the initial language into the preferred language and based on the translated captured data, the computer system performing the replay of the session by presenting the content in the preferred language and not in the initial language. The replay of the session is viewed by the analyst. The method further includes if the preferred language matches the initial language, the computer system performing the replay of the session by presenting the content in the initial language, without translating the captured data.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of changing a language for a replay of a session of a user. The method includes the computer system capturing data from requests and responses included in hits in the session. The method further includes based on the captured data, the computer system determining an initial language of content presented to the user in the session. The method further includes the computer system obtaining a selection by an analyst of a preferred language for the replay of the session. The method further includes the computer system determining whether the preferred language selected by the analyst matches the initial language of the content presented to the user in the session. The method further includes if the preferred language selected by the analyst does not match the initial language of the content presented to the user in the session, the computer system translating the captured data from the initial language into the preferred language and based on the translated captured data, the computer system performing the replay of the session by presenting the content in the preferred language and not in the initial language. The replay of the session is viewed by the analyst. The method further includes if the preferred language matches the initial language, the computer system performing the replay of the session by presenting the content in the initial language, without translating the captured data.

Embodiments of the present invention enhance customer experience management software by converting content of a user session from an initial language of a user session to a different language for a replay of the user session, where the different language is a preferred language of a business analyst. Presenting the replay of the user session in the preferred language rather than the initial language allows the business analyst to easily and quickly analyze the user experience. Furthermore, embodiments of the present invention may allow a team of business analysts to be streamlined and work efficiently, even though the team may be skilled in a single preferred language. The team of business analysts may analyze replays of multiple user sessions, where the content of all of the replays are presented in the preferred language of the team, even though the content had been presented in the initial user sessions in multiple languages other than the preferred language.

DETAILED DESCRIPTION

Overview

A business analyst uses known customer experience management software to capture and replay a user session (i.e., application session) in a natural human language that had been selected by the customer who performed the user session. If the customer is using the website in his/her preferred regional language and if the business analyst is from a different region and is not fluent in the preferred regional language of the customer, then it is difficult for the business analyst to understand the replay of the user session. Embodiments of the present invention replay a user session in one or more preferred languages, even if the preferred language is different from the language of the content that had been presented to the customer in the user session. Embodiments of the present invention allow a replay server to change the language of a replay of a user session on the fly, thereby allowing a business analyst to change the language of a user session replay at any time during the replay.

As used herein, a language of a user session, a language of a replay of a user session, and a preferred language or a preferred regional language of a customer are each defined as a natural human language. As used herein, a business analyst is defined as a person who optimizes digital experiences by identifying user behavior patterns, operational issues, application design flaws, potential fraudulent behavior, and obstacles to key business processes. A business analyst finds and replays user sessions that represent business transactions (e.g., placing an order or generating a quote), and identifies user sessions in which customers were unable to complete the transaction.

System for Changing a Language for a User Session Replay

Figure 1:
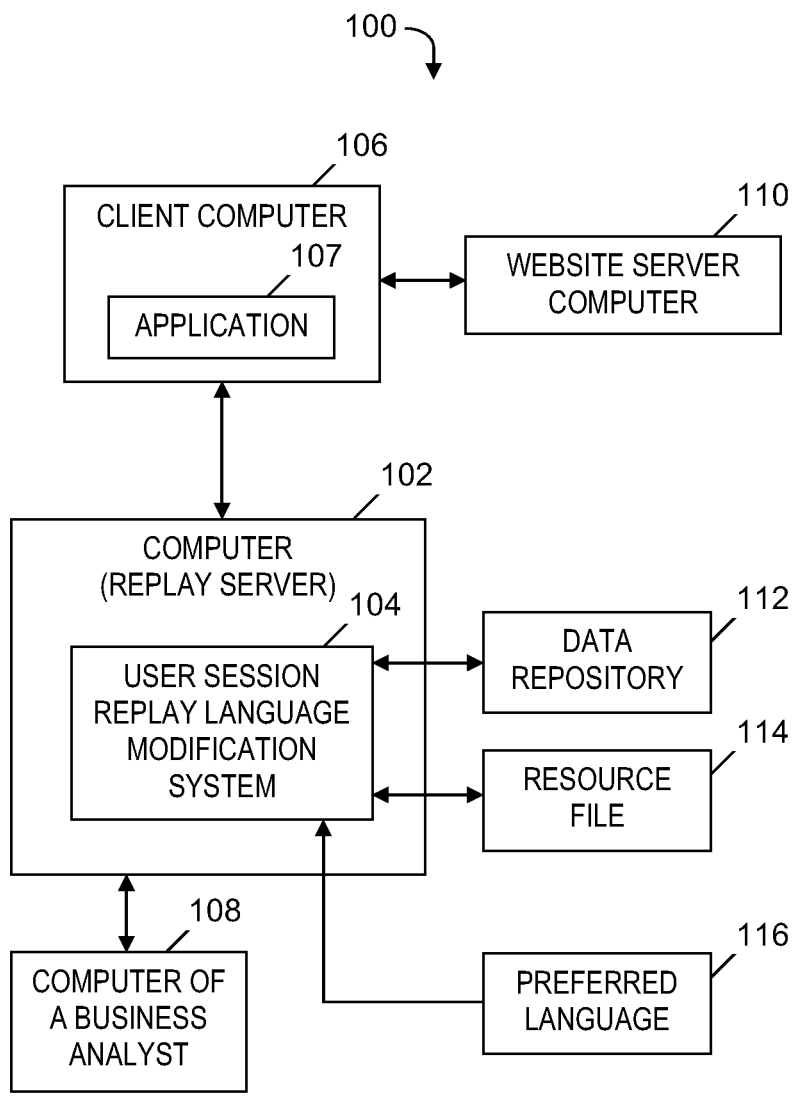
FIG. 1 is a block diagram of a system for changing a language for a replay of a user session, in accordance with embodiments of the present invention.

FIG. 1 is a block diagram of a system 100 for changing a language for a replay of a user session, in accordance with embodiments of the present invention. System 100 includes a computer 102 (also known as a replay server), which executes a software-based user session replay language modification system 104. Computer 102 is operably coupled to a client computer 106 and a computer 108 of a business analyst via one or more computer networks (not shown). Client computer 106 is operably coupled to a website server computer 110 via a computer network (not shown). Client computer 106 may be a smartphone, a personal digital assistant, a terminal, a personal computer, a laptop computer, a table computer, or any other computing device that executes a software-based application 107. The application 107 performs actions in a user session in which different functions on client computer 106 are performed (e.g., purchase an item, search the internet, etc.). In one embodiment, application 107 operates within a web browser environment and communicates with a web application (not shown) being executed on website server computer 110. In another embodiment, application 107 is a native application that may operate independently of the aforementioned web application or may exchange information with the web application.

In one embodiment, a software agent (not shown) is embedded in application 107 and captures client events during the user session. The agent sends the captured client events to computer 102. The agent may send the client events in JSON format. The client events may identify any navigation, history, sequence, and/or state of the user session. The client events may also include image data, such as a height, a width, and a location of webpage elements. The client events may also include text, names, field identifiers, location identifiers, image data, Document Object Models (DOMs), mouse clicks, keyboard entries, metadata, or any other data that may be associated with a user input or application state for the user session.

Computer 102 stores the captured client events in a data repository 112. User session replay language modification system 104 generates HyperText Markup Language (HTML) and Cascading Style Sheet (CSS) code from a resource file 114, which is an image generation file that includes software code for generating application 107. For example, resource file 114 may include a collection of Extensible Markup Language (XML) code used by application 107 to display icons, menus, dialog boxes, strings, tables, text box locators, button locators, user-defined binary data, or any other type of data.

User session replay language modification system 104 determines an initial language of content being presented to a user who initiates actions of the user session. User session replay language modification system 104 also obtains a selection of an identification of a preferred language 116 for a replay of the user session, where the selection is performed by a business analyst who is initiating an analysis of the user session. User session replay language modification system 104 is configured to determine whether the initial language of content presented to the user in the user session matches preferred language 116 and to convert the captured client events (which are in the initial language of the content presented to the user in the user session) into the preferred language 116 and replay the user session in the preferred language 116 if the initial language does not match preferred language 116. User session replay language modification system 104 sends the replay of the user session to computer 108 so that the content of the replay is presented in preferred language 116. Presenting the content of the replay in preferred language 116 facilitates an analysis by the business analyst of the replay because the business analyst is fluent in the preferred language 116 and is able to understand the content in the replay of the user session because it is presented in preferred language 116, while the business analyst does not have sufficient fluency skills in the initial language and therefore is not able to understand the content in a replay of the user session had it been presented in the initial language.

In one embodiment, system 100 includes and is an enhancement of a capture and replay system described in "Capturing and Replaying Application Sessions Using Resource Files," U.S. Patent Application Publication No. 2014/0108911, which is hereby incorporated by reference herein, in its entirety. The functionality of the components shown in FIG. 1 is described in more detail in the discussion of FIG. 2 and FIG. 3 presented below.

Process for Changing a Language for a User Session Replay

Figure 2:
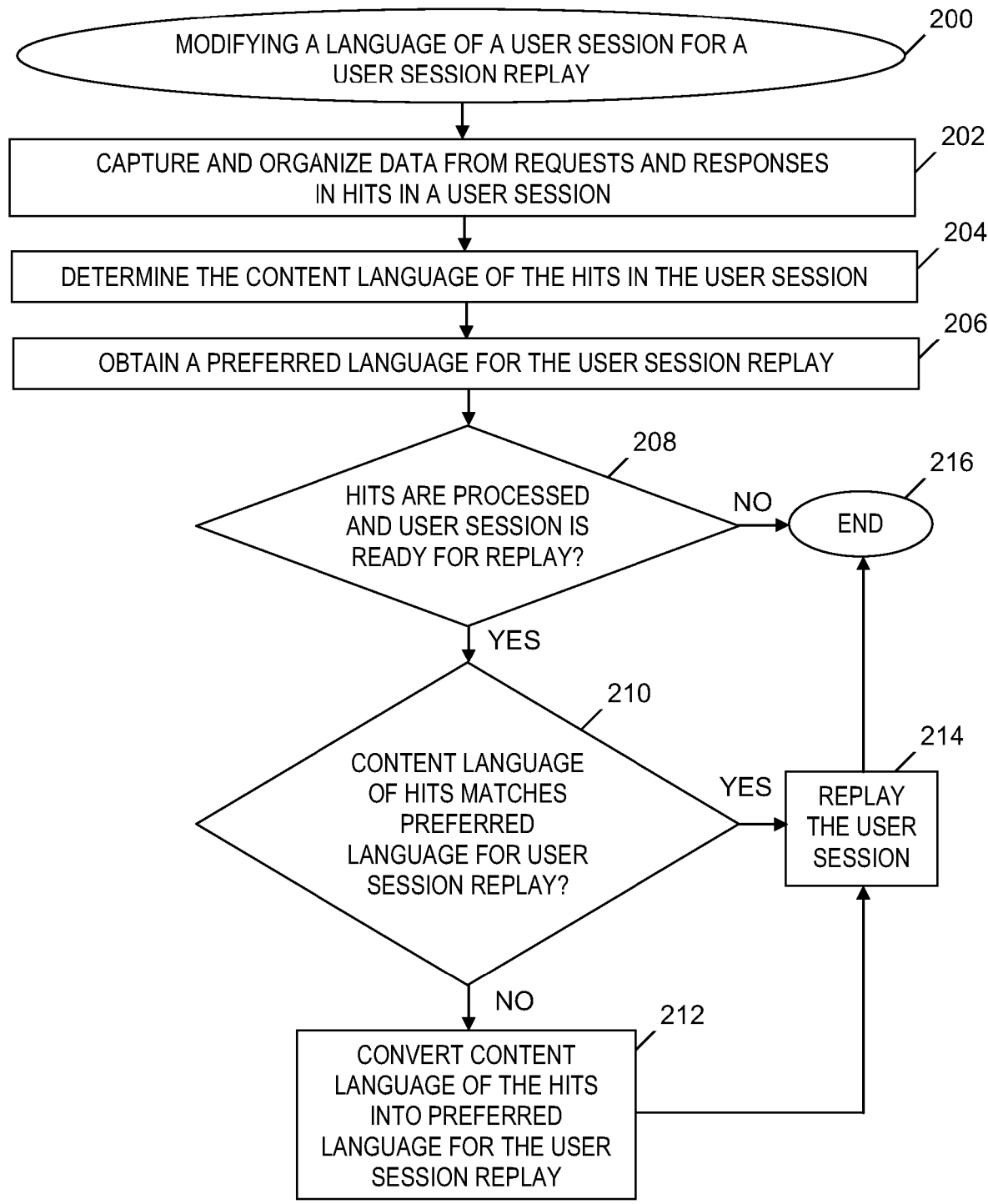
FIG. 2 is a flowchart of a process of changing a language for a replay of a user session, where the process is implemented in the system of FIG. 1, in accordance with embodiments of the present invention.
Figure 3:
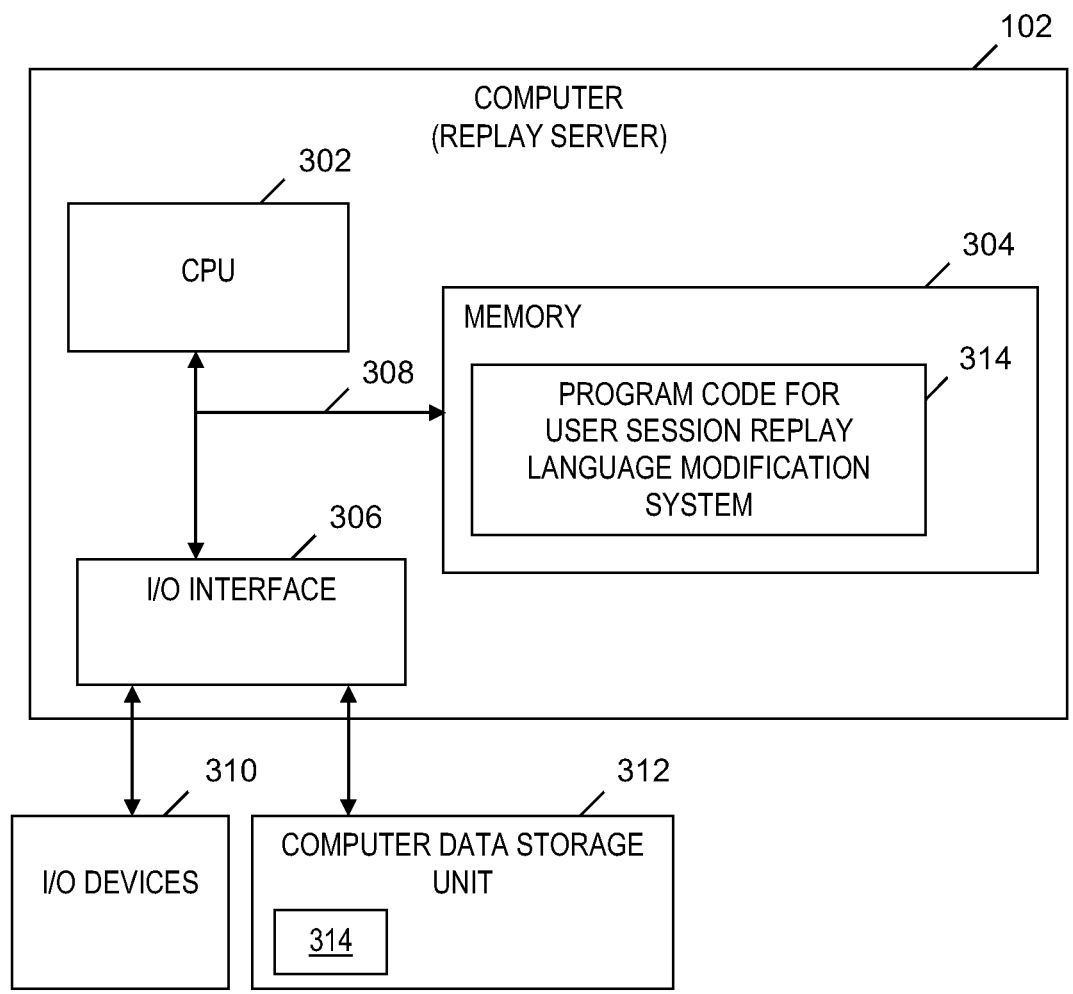
FIG. 3 is a block diagram of a computer included in the system of FIG. 1 and that implements the process of FIG. 2, in accordance with embodiments of the present invention.

FIG. 2 is a flowchart of a process of changing a language for a replay of a user session, where the process is implemented in the system of FIG. 1, in accordance with embodiments of the present invention. The process of FIG. 2 starts at step 200. In step 202, user session replay language modification system 104 (see FIG. 1) captures data (i.e., client events) of a user session associated with an execution of application 107 (see FIG. 1). Step 202 includes user session replay language modification system 104 (see FIG. 1) organizing the captured data into requests and responses within hits in the user session. As used herein, a hit is a request/response pair, where the request is a client request to a server for a file. For example, a hit may include a request to a web server for a web page, image, script, style sheet, etc.

In step 204, user session replay language modification system 104 (see FIG. 1) determines the content language of the hits in the user session. The content language (i.e., initial language) is the language of the content presented to the user during the user session. Step 204 includes user session replay language modification system 104 (see FIG. 1) storing an identification of the content language in data repository 112 (see FIG. 1).

In step 206, user session replay language modification system 104 (see FIG. 1) obtains an identification of preferred language 116 (see FIG. 1), which is a language preferred by an analyst (e.g., business analyst) who is initiating an analysis of the user experience associated with the user session. Obtaining the identification of preferred language 116 (see FIG. 1) may include obtaining a selection by the analyst of preferred language 116 (see FIG. 1).

In step 208, user session replay language modification system 104 (see FIG. 1) determines whether the hits of the user session are processed (i.e., whether all of the data of the user session has been captured and organized into all of the hits of the user session in step 202) and whether the user session is ready to be replayed. If user session replay language modification system 104 (see FIG. 1) determines that the hits are processed and the user session is ready to be replayed, then the Yes branch of step 208 is taken and step 210 is performed.

In step 210, user session replay language modification system 104 (see FIG. 1) determines whether the content language matches the preferred language 116 (see FIG. 1). If user session replay language modification system 104 (see FIG. 1) determines in step 210 that the content language does not match preferred language 116 (see FIG. 1), then the No branch of step 210 is taken and step 212 is performed.

In step 212, user session replay language modification system 104 (see FIG. 1) converts (i.e., translates) the content language of the hits of the user session into the preferred language 116 (see FIG. 1). In one embodiment, user session replay language modification system 104 (see FIG. 1) employs a language translation application programming interface (API) to translate the content specified by the captured data from the content language to the preferred language 116 (see FIG. 1).

In step 214 following step 212, user session replay language modification system 104 (see FIG. 1) replays the user session using the hits whose language was converted in step 212, so that the replay of the user session presents the analyst with the content of the user session expressed in the preferred language 116 (see FIG. 1) and not in the content language. After step 214, user session replay language modification system 104 (see FIG. 1) sends the replay of the user session to computer 108 (see FIG. 1), so that the analyst analyzes the replay of the user session in a language (i.e., preferred language 116 (see FIG. 1)) that the analyst understands rather than in the content language, in which the analyst does not have a level of fluency that allows the analyst to perform an analysis of the replay in order to improve the user experience associated with application 107 (see FIG. 1). Because the replay of the user session is in the preferred language 116 (see FIG. 1), the analyst completes the analysis of the replay, which results in an improvement of the user experience associated with application 107 (see FIG. 1).

Following step 214, the process of FIG. 2 ends at step 216.

Returning to step 208, if user session replay language modification system 104 (see FIG. 1) determines that the hits of the user session are not processed or the user session is not ready to be replayed, then the No branch of step 208 is taken and the process of FIG. 2 ends at step 216.

Returning to step 210, if user session replay language modification system 104 (see FIG. 1) determines that the content language matches the preferred language 116 (see FIG. 1), then the Yes branch of step 210 is taken and step 214 is performed. In step 214 following step 210, user session replay language modification system 104 (see FIG. 1) replays the user session using the hits whose content is in the aforementioned content language, which is the same as preferred language 116 (see FIG. 1), so that the replay of the user session presents the analyst with the content of the user session expressed in the preferred language 116 (see FIG. 1), without converting the content language to another language. After step 214 which follows step 210, user session replay language modification system 104 (see FIG. 1) sends the replay of the user session to computer 108 (see FIG. 1), so that the analyst analyzes the replay of the user session in a language (i.e., preferred language 116 (see FIG. 1)) that the analyst understands, which allows the analyst to perform an analysis of the replay in order to improve the user experience associated with application 107 (see FIG. 1). Because the replay of the user session is in the preferred language 116 (see FIG. 1), the analyst completes the analysis of the replay, which results in an improvement of the user experience associated with application 107 (see FIG. 1). Following step 214, the process of FIG. 2 ends at step 216.

In one embodiment, the process of FIG. 2 is modified to include the following steps prior to step 208: (1) user session replay language modification system 104 (see FIG. 1) parses events (i.e., client events) included in the data captured in step 202; (2) user session replay language modification system 104 (see FIG. 1) identifies a next event included in the parsed events or if there is no next event to be processed then the modified process of FIG. 2 ends; (3) user session replay language modification system 104 (see FIG. 1) determines whether the next event indicates a change in an image displayed on a screen of client computer 106 (see FIG. 1) (i.e., indicates a screen view change); (4) if the determination in step (3) indicates the change in the image, then user session replay language modification system 104 (see FIG. 1) searches Hypertext Markup Language (HTML) documents generated from resource file 114 (see FIG. 1) from which image data for the user session is reproduced; (5) in response to the search in step (4), user session replay language modification system 104 (see FIG. 1) determining whether one of the HTML documents specify the change in the image; (6) if the determination in step (5) indicates an HTML document that specifies the change in the image, user session replay language modification system 104 (see FIG. 1) replays the user session by employing the HTML document that specifies the change in the image; (7) if the determination in step (6) indicates that none of the HTML documents searched in step (4) specify the change in the image, user session replay language modification system 104 (see FIG. 1) generates an HTML document that specifies the change in the image and replays the user session by employing the generated HTML document; and (8) if the determination in step (3) indicates that the next event does not indicate a change in the image, then user session replay language modification system 104 (see FIG. 1) generates scripts that apply the next event to the HTML documents generated from resource file 114 (see FIG. 1).

In one embodiment, during the replay of the user session, the process of FIG. 2 is modified to include the following steps: (1) user session replay language modification system 104 (see FIG. 1) replays a first portion of the user session in a first language; (2) subsequent to step (1) but before the replay of the user session replays a second portion of the user session, user session replay language modification system 104 (see FIG. 1) receives from the analyst a selection of a second language which is different from the first language, where the selection indicates that the second language will be the language of a next portion of the replay of the user session; (3) during the replay of the user session, prior to a replay of the second portion, and in response to step (2), user session replay language modification system 104 (see FIG. 1) translates data for the second portion of the user session from the first language to the second language (or from the content language to the second language, where the first language is different from the content language); and (4) during the replay of the user session and in response to step (3), user session replay language modification system 104 (see FIG. 1) replays the second portion of the user session in the second language and not in any other language. That is, user session replay language modification system 104 (see FIG. 1) translates the content in the replay of the user session on the fly (i.e., during the replay of the user session).

Computer System

FIG. 3 is a block diagram of a computer included in the system of FIG. 1 and that implements the process of FIG. 2, in accordance with embodiments of the present invention. Computer 102 (i.e., relay server) is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for user session replay language modification system 104 (see FIG. 1) to perform a method of changing a language for a user session replay, where the instructions are executed by CPU 302 via memory 304. CPU 302 may include a single processing unit, or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to change a language for a user session replay. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

Storage unit 312 and/or one or more other computer data storage units (not shown) that are coupled to computer 102 may include data repository 112 (see FIG. 1), and may store resource file 114 (see FIG. 1) and the identification of preferred language 116 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to changing a language for a user session replay. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to change a language for a user session replay. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of changing a language for a user session replay.

While it is understood that program code 314 for changing a language for a user session replay may be deployed by manually loading directly in client, server and proxy computers (not shown) via loading a computer readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of changing a language for a user session replay. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of changing a language for a replay of a session of a user, the method comprising:
    capturing, by one or more processors, data from requests and responses included in hits in the session;
    based on the captured data, determining, by the one or more processors, an initial language of content presented to the user in the session;
    obtaining, by the one or more processors, a selection by an analyst of a preferred language for the replay of the session;
    determining, by the one or more processors, whether the preferred language selected by the analyst matches the initial language of the content presented to the user in the session;
    if the preferred language selected by the analyst does not match the initial language of the content presented to the user in the session, translating, by the one or more processors, the captured data from the initial language into the preferred language and based on the translated captured data, performing, by the one or more processors, the replay of the session by presenting the content in the preferred language and not in the initial language, the replay of the session being viewed by the analyst, or if the preferred language matches the initial language, performing, by the one or more processors, the replay of the session by presenting the content in the initial language, without translating the captured data;
    parsing, by the one or more processors, events included in the captured data;
    identifying, by the one or more processors, a next event in the parsed events;
    determining, by the one or more processors, that the next event indicates a change in an image displayed on a computing device being utilized by the user during the session;
    searching, by the one or more processors, Hypertext Markup Language (HTML) documents generated from a resource file from which image data for the session is reproduced;
    in response to the searching, determining, by the one or more processors, that the HTML documents do not include an HTML document that specifies the change in the image displayed on the computing device; and
    based on the HTML documents not including the HTML document that specifies the change in the image displayed on the computing device, generating, by the one or more processors, the HTML document that specifies the change in the image displayed on the computing device, wherein the performing the replay of the session by presenting the content in the preferred language includes replaying the session by employing the generated HTML document.

2. The method of claim 1, further comprising:
    during the replay of the session, replaying, by the one or more processors, a first portion of the session in the preferred language;
    subsequent to the replaying the first portion of the session but before the replay of the session is completed, obtaining, by the one or more processors, a selection by the analyst of a second language, the second language being different from the preferred language; and
    during the replay of the session and in response to the obtaining the selection of the second language, replaying, by the one or more processors, a second portion of the session in the second language.

3. The method of claim 1, wherein the translating the captured data into the preferred language includes employing a language translation application programming interface to translate the captured data from the initial language to the preferred language.

4. The method of claim 1, further comprising determining, by the one or more processors, that the preferred language does not match the initial language, wherein the parsing the events includes parsing the events included in the captured data within a JSON file, wherein the step of generating the HTML document includes generating the HTML document that employs a combination of events in the JSON file and data from the resource file, and wherein the performing the replay of the session by presenting the content in the preferred language is based on the generated HTML document.

5. The method of claim 1, further comprising:
    obtaining, by the one or more processors, a selection of a second preferred language for the replay of the session, the second preferred language being different from the preferred language selected by the analyst;
    determining, by the one or more processors, that the initial language does not match the second preferred language; and
    based on the initial language not matching the second preferred language, translating, by the one or more processors, the captured data from the initial language into to the second preferred language and replaying the session by presenting the content in the second preferred language, wherein the presenting the content in the preferred language and the presenting the content in the second preferred language are performed at least in part simultaneously.

6. The method of claim 1, further comprising:
providing at least one support service for at least one of creating, integrating, hosting, maintaining, and deploying computer readable program code in the computer, the program code being executed by a processor of the computer to implement the capturing the data from the requests and responses in the hits in the session, the determining the initial language, the obtaining the selection of the preferred language, the determining whether the preferred language matches the initial language, if the preferred language does not match the initial language, the translating the captured data into the preferred language and the performing the replay of the session by presenting the content in the preferred language and not in the initial language, or if the preferred language matches the initial language, the performing the replay of the session by the presenting the content in the initial language without translating the captured data, the parsing the events included in the captured data, the identifying the next event in the parsed events, the determining that the next event indicates the change in the image displayed on the computing device, the searching the Hypertext Markup Language (HTML) documents, the determining that the HTML documents do not include the HTML document that specifies the change in the image displayed on the computing device, the generating the HTML document that specifies the change in the image displayed on the computing device.

7. A computer program product, comprising:
a computer readable storage medium; and
a computer readable program code stored in the computer readable storage medium, the computer readable program code containing instructions that are executed by a central processing unit (CPU) of a computer system to implement a method of changing a language for a replay of a session of a user, the method comprising:
the computer system capturing data from requests and responses included in hits in the session;
based on the captured data, the computer system determining an initial language of content presented to the user in the session;
the computer system obtaining a selection by an analyst of a preferred language for the replay of the session;
the computer system determining whether the preferred language selected by the analyst matches the initial language of the content presented to the user in the session;
if the preferred language selected by the analyst does not match the initial language of the content presented to the user in the session, the computer system translating the captured data from the initial language into the preferred language and based on the translated captured data, the computer system performing the replay of the session by presenting the content in the preferred language and not in the initial language, the replay of the session being viewed by the analyst, or if the preferred language matches the initial language, the computer system performing the replay of the session by presenting the content in the initial language, without translating the captured data;

the computer system parsing events included in the captured data;
the computer system identifying a next event in the parsed events;
the computer system determining that the next event indicates a change in an image displayed on a computing device being utilized by the user during the session;
the computer system searching Hypertext Markup Language (HTML) documents generated from a resource file from which image data for the session is reproduced;
in response to the searching, the computer system determining that the HTML documents do not include an HTML document that specifies the change in the image displayed on the computing device; and
based on the HTML documents not including the HTML document that specifies the change in the image displayed on the computing device, the computer system generating the HTML document that specifies the change in the image displayed on the computing device, wherein the performing the replay of the session by presenting the content in the preferred language includes replaying the session by employing the generated HTML document.

8. The computer program product of claim 7, wherein the method further comprises:
during the replay of the session, the computer system replaying a first portion of the session in the preferred language;
subsequent to the replaying the first portion of the session but before the replay of the session is completed, the computer system obtaining a selection by the analyst of a second language, the second language being different from the preferred language; and
during the replay of the session and in response to the obtaining the selection of the second language, the computer system replaying a second portion of the session in the second language.

9. The computer program product of claim 7, wherein the translating the captured data into the preferred language includes employing a language translation application programming interface to translate the captured data from the initial language to the preferred language.

10. The computer program product of claim 7, wherein the method further comprises the computer system determining that the preferred language does not match the initial language, wherein the parsing the events includes parsing the events included in the captured data within a JSON file, wherein the generating the HTML document includes generating the HTML document that employs a combination of events in the JSON file and data from the resource file, and wherein the performing the replay of the session by presenting the content in the preferred language is based on the generated HTML document.

11. The computer program product of claim 7, wherein the method further comprises:
the computer system obtaining a selection of a second preferred language for the replay of the session, the second preferred language being different from the preferred language selected by the analyst;
the computer system determining that the initial language does not match the second preferred language; and
based on the initial language not matching the second preferred language, the computer system translating the captured data from the initial language into to the second preferred language and replaying the session by presenting the content in the second preferred language, wherein the presenting the content in the preferred language and the presenting the content in the second preferred language are performed at least in part simultaneously.

12. A computer system comprising:

a central processing unit (CPU);

a memory coupled to the CPU; and a computer readable storage device coupled to the CPU, the storage device containing instructions that are executed by the CPU via the memory to implement a method of changing a language for a replay of a session of a user, the method comprising:

the computer system capturing data from requests and responses included in hits in the session;

based on the captured data, the computer system determining an initial language of content presented to the user in the session;

the computer system obtaining a selection by an analyst of a preferred language for the replay of the session;

the computer system determining whether the preferred language selected by the analyst matches the initial language of the content presented to the user in the session;

if the preferred language selected by the analyst does not match the initial language of the content presented to the user in the session, the computer system translating the captured data from the initial language into the preferred language and based on the translated captured data, the computer system performing the replay of the session by presenting the content in the preferred language and not in the initial language, the replay of the session being viewed by the analyst, or if the preferred language matches the initial language, the computer system performing the replay of the session by presenting the content in the initial language, without translating the captured data;

the computer system parsing events included in the captured data;

the computer system identifying a next event in the parsed events;

the computer system determining that the next event indicates a change in an image displayed on a computing device being utilized by the user during the session;

the computer system searching Hypertext Markup Language (HTML) documents generated from a resource file from which image data for the session is reproduced;

in response to the searching, the computer system determining that the HTML documents do not include an HTML document that specifies the change in the image displayed on the computing device; and based on the HTML documents not including the HTML document that specifies the change in the image displayed on the computing device, the computer system generating the HTML document that specifies the change in the image displayed on the computing device, wherein the performing the replay of the session by presenting the content in the preferred language includes replaying the session by employing the generated HTML document.

13. The computer system of claim 12, wherein the method further comprises:

during the replay of the session, the computer system replaying a first portion of the session in the preferred language;

subsequent to the replaying the first portion of the session but before the replay of the session is completed, the computer system obtaining a selection by the analyst of a second language, the second language being different from the preferred language; and during the replay of the session and in response to the obtaining the selection of the second language, the computer system replaying a second portion of the session in the second language.

14. The computer system of claim 12, wherein the translating the captured data into the preferred language includes employing a language translation application programming interface to translate the captured data from the initial language to the preferred language.

15. The computer system of claim 12, wherein the method further comprises the computer system determining that the preferred language does not match the initial language, wherein the parsing the events includes parsing the events included in the captured data within a JSON file, wherein the generating the HTML document includes generating the HTML document that employs a combination of events in the JSON file and data from the resource file, and wherein the performing the replay of the session by presenting the content in the preferred language is based on the generated HTML document.

16. The computer system of claim 12, wherein the method further comprises:

the computer system obtaining a selection of a second preferred language for the replay of the session, the second preferred language being different from the preferred language selected by the analyst;

the computer system determining that the initial language does not match the second preferred language; and based on the initial language not matching the second preferred language, the computer system translating the captured data from the initial language into to the second preferred language and replaying the session by presenting the content in the second preferred language, wherein the presenting the content in the preferred language and the presenting the content in the second preferred language are performed at least in part simultaneously.

* * * * *